(12) United States Patent
Ohashi et al.

(10) Patent No.: US 9,868,815 B2
(45) Date of Patent: Jan. 16, 2018

(54) COPOLYMERIZED POLYESTER RESIN

(71) Applicant: TOYOBO CO., LTD., Osaka (JP)

(72) Inventors: Hideto Ohashi, Fukui (JP); Nobuyuki Hironaka, Fukui (JP)

(73) Assignee: TOYOBO CO., LTD., Osaka (JP)

(*) Notice: Subject to any disclaimer, the term of this patent is extended or adjusted under 35 U.S.C. 154(b) by 109 days.

(21) Appl. No.: 15/029,699

(22) PCT Filed: Oct. 22, 2014

(86) PCT No.: PCT/JP2014/078059
§ 371 (c)(1),
(2) Date: Apr. 15, 2016

(87) PCT Pub. No.: WO2015/060335
PCT Pub. Date: Apr. 30, 2015

(65) Prior Publication Data
US 2016/0237207 A1  Aug. 18, 2016

(30) Foreign Application Priority Data
Oct. 24, 2013  (JP) .................................. 2013-221138

(51) Int. Cl.
*C08G 63/672* (2006.01)
*C08J 5/18* (2006.01)
*C09J 167/02* (2006.01)

(52) U.S. Cl.
CPC .............. *C08G 63/672* (2013.01); *C08J 5/18* (2013.01); *C09J 167/02* (2013.01); *C08J 2367/02* (2013.01)

(58) Field of Classification Search
None
See application file for complete search history.

(56) References Cited

U.S. PATENT DOCUMENTS

| | | | |
|---|---|---|---|
| 4,604,453 A | 8/1986 | Kuze et al. | |
| 2004/0236063 A1* | 11/2004 | Suzuki | C08J 3/12 528/275 |

FOREIGN PATENT DOCUMENTS

| | | |
|---|---|---|
| JP | 6-39521 | 5/1994 |
| JP | 6-45175 | 6/1994 |
| JP | 2002-88235 | 3/2002 |
| JP | 2002-322250 | 11/2002 |
| JP | 2002-322255 | 11/2002 |
| JP | 2002-327052 | 11/2002 |
| JP | 2004-67733 | 3/2004 |
| JP | 2004-83620 | 3/2004 |
| JP | 2004-123984 | 4/2004 |
| JP | 2004-137292 | 5/2004 |
| JP | 2004-256819 | 9/2004 |
| JP | 2008-111076 | 5/2008 |
| JP | 2009-73962 | 4/2009 |
| JP | 2009073962 A * | 4/2009 |
| JP | 2011-46860 | 3/2011 |

OTHER PUBLICATIONS

English Language Machine Translation of JP2009073962 made Sep. 22, 2017. (Year: 2017).*
International Search Report dated Nov. 25, 2014 in International Application No. PCT/JP2014/078059.

* cited by examiner

*Primary Examiner* — Christopher M Rodd
(74) *Attorney, Agent, or Firm* — Wenderoth, Lind & Ponack, L.L.P.

(57) ABSTRACT

The present invention is a copolymerized polyester resin which contains a dicarboxylic acid component and diol components as constituting components, wherein greater than or equal to 90 mol % of terephthalic acid is contained as the dicarboxylic acid component, 39 to 79 mol % of ethylene glycol, 20 to 60 mol % of neopentyl glycol and 1 to 5 mol % of diethylene glycol are contained as the diol components, the reduced viscosity of the resin is greater than or equal to 0.50 dl/g, the number of contaminants having a particle diameter of greater than or equal to 5 μm is less than or equal to 100 per 1 mm² in a sample of the copolymerized polyester resin having a thickness of 0.8 to 0.9 mm. The copolymerized polyester resin has a higher degree of clarification than conventionally known copolymerized polyesters and also has excellent color hue and heat resistance.

15 Claims, No Drawings

COPOLYMERIZED POLYESTER RESIN

TECHNICAL FIELD

The present invention relates to a copolymerized polyester resin. More specifically, the present invention relates to a copolymerized polyester resin having excellent transparency, containing little contaminants, and having a high degree of clarification.

BACKGROUND ART

Polyesters represented by polyethylene terephthalate (PET), polybutylene terephthalate (PBT) and polyethylene naphthalate (PEN) are excellent in mechanical characteristics and chemical characteristics, and they are used in broad fields such as, for example, fibers for clothing and industrial materials, films and sheets for packaging, magnetic tapes, optics and so on, bottles which are blow-molded articles, casings of electric or electronic parts, and other engineering plastic molded articles depending on the characteristics of each polyester.

Recent market diversification has led attentions on copolymerized polyesters in which other glycol component is copolymerized with the aforementioned polyesters. In particular, copolymers of neopentyl glycol or 1,4-cyclohexane dimethanol are amorphous and have a high glass transition point, and are widely used in the film filed and so on. These copolymerized polyesters and methods for producing the same have been disclosed (see PTDs 1 to 5, for example).

One use application of the aforementioned copolymerized polyesters lies in the filed of films and sheets. In such a field, high transparency, little contaminants, and high degree of clarification of the film or sheet are very important characteristics, and it is an important issue how these characteristics are ensured.

Generally, polyester is produced by preparing an oligomer mixture by esterification or transesterification between a dicarboxylic acid and/or an ester-forming derivative thereof, and a diol and/or an ester-forming derivative thereof, and liquid-phase polycondensing the oligomer mixture in a vacuum with the use of a catalyst.

Conventionally, as a polyester polycondensation catalyst that is used during such polycondensation of polyester, antimony compounds, germanium compounds, or titanium compounds are widely used.

Antimony trioxide is a catalyst that is low-priced and has excellent catalytic activity. However, when antimony trioxide is used as a main ingredient, namely it is used in such an adding amount that practical polymerization speed is achieved, metal antimony precipitates at the time of polycondensation, causing occurrences of darkening and contaminants in the polyester.

As a catalyst other than antimony compounds that has excellent catalytic activity and is capable of giving a polyester not having the aforementioned problems, titanium compounds have been already brought into practical use. However, polyesters produced by using titanium compounds such as tetraalkoxy titanate are disadvantageously prone to be thermally degraded at the time of melt molding, and result in significantly colored polyesters.

For the circumstances as described above, there is demanded a polycondensation catalyst composed of a metal component other than antimony, germanium and titanium compounds, as a main metal component of the catalyst, which has excellent catalytic activity, and gives polyesters having excellent color hue and thermal stability and giving a molded article with excellent transparency.

As a novel polycondensation catalyst responding to the aforementioned demand, a catalyst system composed of an aluminum compound and a phosphorus compound is disclosed and notable.

Regarding a method for producing polyester by the polycondensation catalyst system, a preferred adding time of the polycondensation catalyst system is disclosed (see PTDs 6 to 8, for example).

Polyesters obtained by the polycondensation catalyst system have excellent color hue, transparency and thermal stability, and respond to the aforementioned demand. However, in polymerization of copolymerized polyester system, in particular, the characteristics of little contaminants and high degree of clarification are not satisfactorily achieved, and amelioration thereof is strongly demanded. Polyester produced by copolymerization of neopentyl glycol by the method of PTD 5 is disadvantageously accompanied by a large quantity of contaminants.

CITATION LIST

Patent Document

PTD 1: Japanese Patent Laying-Open No. 2004-67733
PTD 2: Japanese Patent Laying-Open No. 2004-83620
PTD 3: Japanese Patent Laying-Open No. 2004-123984
PTD 4: Japanese Patent Laying-Open No. 2004-137292
PTD 5: Japanese Patent Laying-Open No. 2004-256819
PTD 6: Japanese Patent Laying-Open No. 2002-322250
PTD 7: Japanese Patent Laying-Open No. 2002-322255
PTD 8: Japanese Patent Laying-Open No. 2002-327052

SUMMARY OF INVENTION

Technical Problems

The present invention provides a copolymerized polyester having a higher degree of clarification than the conventional known copolymerized polyesters and having excellent color hue and heat resistance, and also provides a copolymerized polyester producible by a polycondensation catalyst composed of a metal component other than antimony and titanium compounds, as a main metal component of the catalyst.

Solutions to Problems

The present inventors made diligent efforts, and found that the aforementioned problems can be solved by the means as shown below, and accomplished the present invention.

That is, the present invention includes the following features.

(1) A copolymerized polyester resin comprising a dicarboxylic acid component and diol components as constituting components, wherein as the dicarboxylic acid component, greater than or equal to 90 mol % of terephthalic acid is contained, and as the diol components, 39 to 79 mol % of ethylene glycol, 20 to 60 mol % of neopentyl glycol, and 1 to 5 mol % of diethylene glycol are contained, and a reduced viscosity is greater than or equal to 0.50 dl/g, and the number of contaminants per 1 $mm^2$ observed by using a phase-contrast optical microscope in a sample of the copolymerized polyester resin having a thickness of 0.8 to 0.9 mm is less than or equal to 100, the contaminants having a particle diameter of greater than or equal to 5 μm.

(2) The copolymerized polyester resin according to (1), wherein a color L value is greater than or equal to 60, and a color b value is less than or equal to 6.

(3) The copolymerized polyester resin according to (1) or (2), wherein as a polymerization catalyst, at least one selected from aluminum compounds and at least one selected from phosphorous compounds are contained in the copolymerized polyester resin.

(4) The copolymerized polyester resin according to any one of (1) to (3), which is obtained by esterifying the dicarboxylic acid component and the diol components so that a carboxylic acid group terminal concentration and a hydroxyl group terminal concentration of a reaction intermediate oligomer after termination of the esterification are 400 to 900 eq/ton, and 700 to 1400 eq/ton, respectively, and conducting polycondensation.

(5) The copolymerized polyester resin according to any one of (1) to (4), wherein as the diol components, a diol component containing ethylene glycol derived from biomass resources is used.

(6) A heat-shrinkable film comprising the copolymerized polyester resin according to any one of (1) to (5).

(7) A molded article comprising the copolymerized polyester resin according to any one of (1) to (5).

(8) A sheet comprising the copolymerized polyester resin according to any one of (1) to (5).

(9) An adhesive comprising the copolymerized polyester resin according to any one of (1) to (5).

Advantageous Effects of Invention

The copolymerized polyester according to the present invention can be widely used as a material for various molded articles such as films, sheets, blow molded bottles, engineering plastics, and fibers because of suppressed contamination and high degree of clarification. In particular, the copolymerized polyester is suited as a material for molded articles in which the degree of clarification is highly required. In particular, the copolymerized polyester is suited as a material for products for optical use application in which the degree of clarification is highly required.

DESCRIPTION OF EMBODIMENTS

Hereinafter, the present invention will be specifically described.
(Copolymerized Polyester Resin)

The copolymerized polyester resin according to the present invention has a feature that the dicarboxylic acid component contains greater than or equal to 90 mol % of a terephthalic acid residue, and the diol components contain 39 to 79 mol % of an ethylene glycol residue, 20 to 60 mol % of a neopentyl glycol residue and 1 to 5 mol % of a diethylene glycol residue.

In the present invention, the "copolymerized polyester resin" includes later-described polymerization catalytic compounds, and contaminants that are insolubilized, aggregated and precipitated inorganic salts or organic salts of the polymerization catalyst compounds formed in the polymerization system. The copolymerized polyester resin can also be regarded as a kind of "composition" in the point that those other than the chemical substance "copolymerized polyester" are contained; however, the expression "copolymerized polyester resin" is used herein because the amounts of the polymerization catalyst compounds and contaminants are very small.

The copolymerized polyester resin of the present invention containing greater than or equal to 90 mol % of the terephthalic acid in the dicarboxylic acid component is preferred in that the required mechanical property is satisfied when the copolymerized polyester resin is formed into a film or a molded article.

The terephthalic acid in the dicarboxylic acid component occupies preferably greater than or equal to 97 mol %, more preferably greater than or equal to 98 mol %. It is also a preferred mode that the terephthalic acid occupies 100 mol %.

As a raw material used herein, an ester-forming derivative of terephthalic acid (e.g., dimethyl terephthalate) is also usable.

Examples of the dicarboxylic acid component other than the terephthalic acid component include saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid, and dimer acid, or ester-forming derivatives thereof, unsaturated aliphatic dicarboxylic acids such as fumaric acid, maleic acid, and itaconic acid, or ester-forming derivatives thereof, and aromatic dicarboxylic acids such as orthophthalic acid, isophthalic acid, 5-(alkali metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracene dicarboxylic acid, or ester-forming derivatives thereof.

Among these dicarboxylic acids, isophthalic acid, adipic acid, sebacic acid and azelaic acid are preferred in the point of physical properties of the resulting polyester, and other dicarboxylic acid may be added as a constituting component as necessary.

Besides these dicarboxylic acids, a small amount of polyvalent carboxylic acid may be used together. Examples of the polyvalent carboxylic acid include ethane tricarboxylic acid, propane tricarboxylic acid, butane tetracarboxylic acid, pyromellitic acid, trimellitic acid, trimesic acid, and 3,4,3',4'-biphenyltetracarboxylic acid. These polyvalent carboxylic acids are contained preferably in an amount of less than or equal to 3 mol % in relation to 100 mol % of the total dicarboxylic acid component.

The copolymerized polyester resin of the present invention containing 39 to 79 mol % of ethylene glycol, 20 to 60 mol % of neopentyl glycol, and 1 to 5 mol % of diethylene glycol as diol components is preferred in that a polyester resin having improved transparency and moldability and usable for various use applications can be obtained. As the diol components, ethylene glycol is preferably 40 to 77 mol %, more preferably 42 to 75 mol %. As the diol components, neopentyl glycol is preferably 22 to 58 mol %, more preferably 24 to 56 mol %. As the diol components, diethylene glycol is preferably 1 to 3 mol %.

As the diol components, the three components: ethylene glycol, neopentyl glycol, and diethylene glycol occupy preferably greater than 90 mol %, more preferably greater than 95 mol % of the total diol components. It is also a preferred mode that as the diol components, the three components: ethylene glycol, neopentyl glycol, and diethylene glycol occupy 100 mol %. The diethylene glycol may be charged as a raw material, or may be obtained by condensation of ethylene glycol at the time of polymerization.

Examples of other diols include aliphatic glycols such as 1,2-propylene glycol, 1,3-propylene glycol, triethylene glycol, 1,2-butylene glycol, 1,3-butylene glycol, 2,3-butylene glycol, 1,4-butylene glycol, 1,5-pentanediol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol, and aromatic glycols such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols in which ethylene oxide is added to these glycols.

Among these diols, 1,3-propylene glycol, 1,4-butylene glycol, and 1,4-cyclohexanedimethanol are preferred.

As the diol components, ethylene glycol derived from biomass resources can be used as long as the object of the copolymerized polyester of the present invention is not impaired.

Besides these glycols, a small amount of polyhydric alcohol may be used together. Examples of the polyhydric alcohol include trimethylolmethane, trimethylolethane, trimethylolpropane, pentaerythritol, glycerol, and hexanetriol. These polyhydric alcohols are contained preferably in an amount of less than or equal to 3 mol % in relation to 100 mol % of the total diol components.

Also a hydroxycarboxylic acid may be used together. Examples of the hydroxycarboxylic acid include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexane carboxylic acid, and ester-forming derivatives thereof. These hydroxycarboxylic acids are contained preferably in an amount of less than or equal to 3 mol % in relation to 100 mol % of the total dicarboxylic acid component.

Also a cyclic ester may be used together. Examples of the cyclic ester include ε-caprolactone, β-propiolactone, β-methyl-β-propiolactone, δ-valerolactone, glycolide, and lactide. These cyclic esters are contained preferably in an amount of less than or equal to 3 mol % in relation to 100 mol % of the total dicarboxylic acid component.

As the ester-forming derivatives of dicarboxylic acid, polyvalent carboxylic acid or hydroxycarboxylic acid, alkyl esters or hydroxylalkyl esters of these compounds can be recited.

As the diol components, an ester-forming derivative can also be used, and as an ester-forming derivative of diol, ester of diol with lower aliphatic carboxylic acid such as acetic acid can be recited.

The reduced viscosity of the copolymerized polyester resin of the present invention is greater than or equal to 0.50 dl/g. The reduced viscosity is preferably greater than or equal to 0.60 dl/g, more preferably greater than or equal to 0.65 dl/g, further preferably greater than or equal to 0.70 dl/g. A preferred upper limit of the reduced viscosity is about 1.00 dl/g.

(Polymerization Catalyst)

Next, a polymerization catalyst that is used in producing the copolymerized polyester resin of the present invention will be described. The polymerization catalyst used in the present invention is a polymerization catalyst featured by having an ability to promote esterification. As such a polymerization catalyst, a polymerization catalyst containing at least one selected from aluminum compounds and at least one selected from phosphorous compounds is preferred.

As an aluminum compound that forms the polymerization catalyst for use in synthesizing the copolymerized polyester resin of the present invention, known aluminum compounds can be used without any limitation.

Specific examples of the aluminum compound include aluminum acetate, basic aluminum acetate, aluminum lactate, aluminum chloride, aluminum hydroxide, aluminum hydroxychloride and aluminum acetyl acetonate, organic aluminum compounds such as aluminum oxalate, and partial hydrolysates thereof. Among these, carboxylic acid salts, inorganic acid salts and chelate compounds are preferred, and among these, aluminum acetate, basic aluminum acetate, aluminum lactate, aluminum chloride, aluminum hydroxide, aluminum hydroxychloride and aluminum acetyl acetonate are further preferred, and aluminum acetate, basic aluminum acetate, aluminum chloride, aluminum hydroxide and aluminum hydroxychloride are further preferred, and aluminum acetate, and basic aluminum acetate are most preferred.

The use amount of the aluminum compound for use in the polymerization catalyst of the present invention is selected so that preferably 1 to 80 ppm, more preferably 2 to 60 ppm, further preferably 3 to 50 ppm, particularly preferably 5 to 40 ppm, most preferably 10 to 30 ppm of aluminum atoms remain in relation to the total mass of the obtained copolymerized polyester resin.

If the amount is less than the above-described range, the catalytic activity may be defective, and if the amount is greater than the above-described range, generation of aluminum-based contaminants may be caused.

Since substantially 100% of the use amount of the aluminum compound remains after the aluminum compound is put under a reduced pressure environment at the time of polyester polymerization, it should be thought that the use amount equals the remaining amount.

While the phosphorous compound used in the polymerization catalyst is not particularly limited, it is preferred to use a phosphonic acid-based compound, or a phosphinic acid-based compound because the effect of improving the catalytic activity is large, and among these, it is preferred to use a phosphonic acid-based compound because the effect of improving the catalytic activity is especially large.

Among the phosphorous compounds, phosphorous compounds having a phenol moiety in the same molecule are particularly preferred. While any phosphorous compounds having a phenol structure can be used without any limitation, it is preferred to use one or two or more compounds selected from the group consisting of phosphonic acid-based compounds and phosphinic acid-based compounds having a phenol moiety in the same molecule because the effect of improving the catalytic activity is large. Among these, it is preferred to use one or two or more phosphonic acid-based compounds having a phenol moiety in the same molecule because the effect of improving the catalytic activity is especially large.

As the phosphorous compounds having a phenol moiety in the same molecule, the compounds represented by the following general formulas (1) and (2) are recited.

[Chemical Formula 1]

$$P(=O)R^1(OR^2)(OR^3) \quad \text{Formula (1)}$$

[Chemical Formula 2]

$$P(=O)R^1R^4(OR^2) \quad \text{Formula (2)}$$

(In formulas (1) and (2), $R^1$ represents a hydrocarbon group having 1 to 50 carbon atoms including a phenol moiety, or a hydrocarbon group having 1 to 50 carbon atoms including a sub stituent such as a hydroxyl group, a halogen group, an alkoxyl group or an amino group, and a phenol moiety. $R^4$ represents hydrogen, a hydrocarbon group having 1 to 50 carbon atoms, or a hydrocarbon group having 1 to 50 carbon atoms including a substituent such as a hydroxyl group, a halogen group, an alkoxyl group or an amino group. $R^2$ and $R^3$ each independently represent hydrogen, a hydrocarbon group having 1 to 50 carbon atoms, or a hydrocarbon group having 1 to 50 carbon atoms including a sub stituent such as a hydroxyl group or an alkoxyl group. However, the hydrocarbon group may contain a branched structure, an alicyclic structure such as cyclohexyl, or an aromatic ring structure such as phenyl or naphthyl. Terminals of $R^2$ and $R^4$ may bind to each other.)

Examples of the phosphorous compounds having a phenol moiety in the same molecule include p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl)phosphinic acid, methyl bis(p-hydroxyphenyl)phosphinate, phenyl bis(p-hydroxyphenyl)phosphinate, p-hydroxyphenylphenyl phosphinic acid, methyl p-hydroxyphenylphenylphosphinate, phenyl p-hydroxyphenylphenylphosphinate, p-hydroxyphenylphosphinic acid, methyl p-hydroxyphenylphosphinate, and phenyl p-hydroxyphenylphosphinate. Besides these, phosphorous compounds represented by the following general formula (3) can be recited.

[Chemical Formula 3]

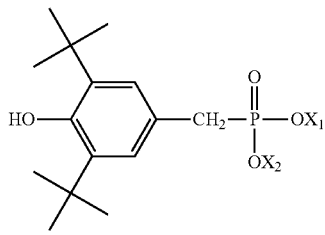

Formula (3)

In formula (3), $X_1$, and $X_2$ each represent hydrogen, an alkyl group having 1 to 4 carbon atoms, or mono- or more-valent metal.

$X_1$ may be bi- or more-valent metal, and $X_2$ may not exist. Further, anions corresponding to an excessive valency of metal with respect to the phosphorous compound may be arranged.

As the metal, Li, Na, K, Ca, Mg, and Al are preferred.

By adding such a phosphorous compound having a phenol moiety in the same molecule at the time of polymerization of polyester, the catalytic activity of the aluminum compound improves, and the thermal stability of the polymerized copolymerized polyester resin also improves.

Among the aforementioned phosphorous compounds, at least one phosphorous compound selected from the compounds represented by chemical formula (4) and chemical formula (5) is preferably used as a polycondensation catalyst.

[Chemical Formula 4]

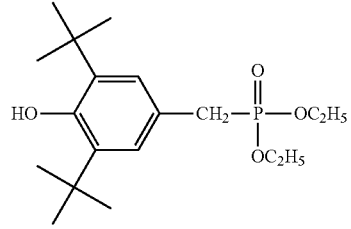

Formula (4)

[Chemical Formula 5]

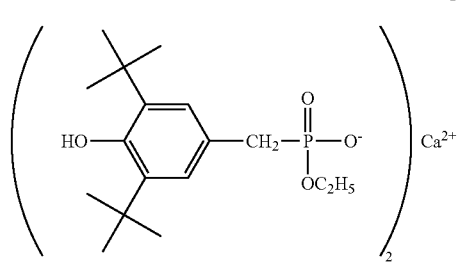

Formula (5)

As a compound represented by chemical formula (4), Irganox1222 (product of BASF) is commercially available. As a compound represented by chemical formula (5), Irganox1425 (product of BASF) is commercially available and usable.

The use amount of the phosphorous compound for use in the polymerization catalyst of the present invention is selected so that preferably 10 to 100 ppm, more preferably 15 to 90 ppm, further preferably 20 to 80 ppm, particularly preferably 25 to 70 ppm, most preferably 30 to 60 ppm of phosphorous atoms remain in relation to the total mass of the obtained copolymerized polyester resin.

If phosphorous atoms remain in an amount exceeding the aforementioned upper limit or lowering the aforementioned lower limit, the polymerization activity may be deteriorated.

When the phosphorous compound is put under a reduced pressure environment at the time of polyester polymerization, about 10 to 30% of the use amount is removed outside the system depending on the condition. In light of this, it is necessary to conduct a trial experiment several times to find the remaining percentage of the phosphorous compound in polyester, and then to determine the use amount.

Also, by using the phosphorous compound, it is possible to improve the heat resistance of the resin. Although the reason is unclear, it is considered that the heat resistance of the copolymerized polyester resin is improved by the hindered phenol moiety in the phosphorous compound.

If the remaining amount of the phosphorous compound is less than 10 ppm, the effect of improving the heat resistance is weakened, and as a result, the effect of ameliorating the heat resistance and the coloring of the copolymerized polyester resin of the present invention may be lost.

In order to further improve the catalytic activity as long as the effect of the present invention is not impaired, a metal-containing polycondensation catalyst such as an antimony compound, a titanium compound, a tin compound, or a germanium compound may be used together. In that case, the antimony compound is preferably less than or equal to 30 ppm as antimony atoms, in relation to the mass of the obtained copolymerized polyester resin, the germanium compound is preferably less than or equal to 10 ppm as germanium atoms, in relation to the mass of the obtained copolymerized polyester resin, the titanium compound is preferably less than or equal to 3 ppm as titanium atoms, in relation to the mass of the obtained copolymerized polyester resin, and the tin compound is preferably less than or equal to 3 ppm as tin atoms, in relation to the mass of the obtained copolymerized polyester resin. Considering the object of the present invention, it is preferred to use these metal-containing polycondensation catalysts such as an antimony compound, a titanium compound, a tin compound, and a germanium compound as little as possible.

In the present invention, in addition to the aluminum compound, a small amount of at least one selected from alkali metal, alkaline earth metal and a compound thereof, may coexist as a second metal-containing component. Coexistence of the second metal-containing component in the catalyst system is effective for improving the catalytic activity, and giving a catalyst component with improved reaction speed, and improving the productivity as well as being effective for suppressing generation of diethylene glycol. When alkali metal, alkaline earth metal, or a compound thereof is used in combination the use amount (mol %) thereof is preferably $1 \times 10^{-5}$ to 0.01 mol % in relation to the molar number of the dicarboxylic acid component constituting the copolymerized polyester resin. Since substantially 100% of the use amount of alkali metal, alkaline earth metal or a compound thereof remains even after it is put under a reduced pressure environment at the time of polyester polymerization, it can be thought that the use amount equals the remaining amount.

The polymerization catalyst according to the present invention has catalytic activities not only on the polycondensation, but also on esterification and transesterification. Transesterification between an alkyl ester of a dicarboxylic acid, such as dimethyl terephthalate, and a glycol such as ethylene glycol is generally conducted in the presence of a transesterification catalyst such as zinc, but in place of this catalyst, the catalyst of the present invention can be used. The polymerization catalyst according to the present invention has catalytic activities not only in melt polymerization but also in solid phase polymerization and solution polymerization.

The polymerization catalyst of polyester used in the present invention can be added to the reaction system in any stage of polymerization. For example, the polymerization catalyst can be added to the reaction system in any stage before starting and during esterification or transesterification, or in any stage directly before starting of polycondensation, or during polycondensation. In particular, it is preferred to add the aluminum compound and the phosphorous compound according to the present invention directly before starting of polycondensation.

(Production of Copolymerized Polyester Resin)

The polymerization method of copolymerized polyester resin is not particularly limited, and by a direct esterification method of a dicarboxylic acid component such as terephthalic acid and a diol component such as ethylene glycol, or by a transesterification method between an alkyl ester of a dicarboxylic acid component such as terephthalic acid and a diol component such as ethylene glycol, an oligomer of the dicarboxylic acid component such as terephthalic acid and the diol component such as ethylene glycol is obtained, and then the oligomer is melt-polymerized under normal or reduced pressure, and thus a copolymerized polyester resin can be obtained.

The copolymerized polyester resin of the present invention can be produced by a method including conventionally known steps. For example, the copolymerized polyester resin is produced by a direct esterification method including the steps of directly reacting terephthalic acid as an acid component with ethylene glycol and neopentyl glycol as diol components and distilling off water to achieve esterification, and then conducting polycondensation under reduced pressure, or by a transesterification method including the steps of reacting dimethyl terephthalate as an acid component with ethylene glycol and neopentyl glycol as diol components and distilling off methyl alcohol to achieve transesterification, and then conducting polycondensation under reduced pressure.

In any of these methods, the esterification or the transesterification may be conducted in one step, or may be conducted in multiple steps. Also the melt polycondensation may be conducted in one step, or may be conducted in multiple steps.

In production of the copolymerized polyester resin of the present invention, it is preferred to use the direct esterification method from the above-described direct esterification method and transesterification method from the view points of the productivity, the cost and the environmental aspect regarding the treatment of the distilled solution.

When the copolymerized polyester resin of the present invention is polymerized by using a polymerization catalyst containing at least one selected from aluminum compounds and at least one selected from phosphorous compounds, physical properties of the reaction intermediate oligomer after termination of the esterification are preferably such that the carboxylic acid group terminal concentration is 400 to 900 eq/ton, and the hydroxyl group terminal concentration is 700 to 1400 eq/ton. This makes it possible to realize sufficient reaction speed of polycondensation, and to prevent precipitation of contaminants formed of the catalyst compounds. The physical properties of the reaction intermediate oligomer are more preferably such that the carboxylic acid group terminal concentration is 500 to 800 eq/ton, and the hydroxyl group terminal concentration is 800 to 1300 eq/ton. The lower limit of the carboxylic acid group terminal concentration of the reaction intermediate oligomer is further preferably 550 eq/ton, particularly preferably 600 eq/ton, and the upper limit is further preferably 780 eq/ton, particularly preferably 750 eq/ton. The lower limit of the hydroxyl group terminal concentration of the reaction intermediate oligomer is further preferably 1000 eq/ton, particularly preferably 1100 eq/ton, and the upper limit is further preferably 1250 eq/ton.

The oligomer used herein refers to a reaction intermediate before conduction of polycondensation after termination of the esterification (or transesterification). The oligomer refers to a reaction intermediate including unreacted raw materials, when such unreacted raw materials exist.

When the carboxylic acid group terminal concentration is greater than 900 eq/ton, or when the hydroxyl group terminal concentration is less than 700 eq/ton, the aluminum compound may be insolubilized in the system and contaminants may occur. This is attributable to the fact that a carboxylic acid group terminal forms a salt with aluminum. Among others, in the copolymerization system involving a group derived from neopentyl glycol in the molecular chain, a carboxylic acid salt of aluminum tends to be easily formed in particular. Further, when the carboxylic acid group terminal concentration is less than 400 eq/ton, or when the hydroxyl group terminal concentration is greater than 1400 eq/ton, the reaction speed of polycondensation may be reduced.

(Method for Measuring Number of Contaminants)

Hereinafter, a method for measuring the number of contaminants in the copolymerized polyester resin of the present invention will be described.

The number of contaminants in the copolymerized polyester resin of the present invention is measured with a method of measuring the sizes and number of particles by analyzing the image of particles in the polymer observed with a phase-contrast optical microscope. Since the phase-contrast optical microscope can convert a slight delay (phase contrast) in wavelength of light transmitting objects having different refractive indexes into a contract of brightness and darkness by using diffraction and refraction of light, the phase-contrast optical microscope is also suited for observation of contaminant particles which look colorless and transparent in polymer in the ordinary microscopic observation. The observed image is captured as electronic data into an image analyzer, and the particle diameter (area circle corresponding diameter) and the number of particles can be measured.

In observation of coarse particles by the phase-contrast optical microscope, since the field area and the focal depth are determined by the magnification and the aperture of the used lens, a difference in these factors causes deviation in the measurement results. In the case of a sample having a high inorganic particle content and small light transmittance, the brightness of the obtained image is low, so that it may be impossible to observe the sample adequately with the use of a lens having high magnification. Further, it is necessary that the thickness of the sample to be observed is sufficiently large in relation to the focal depth of the objective lens. For satisfying these requirements, in the present invention, observation is conducted by using a lens having a magnification of 10 times, and an aperture of 0.5 as a phase difference objective lens of the phase-contrast optical microscope.

The number of contaminants in the copolymerized polyester resin of the present invention indicates the number of contaminants having a particle diameter of greater than or equal to 5 µm per 1 mm$^2$ measured by the following procedure from a sample of the copolymerized polyester resin having a thickness of 0.8 to 0.9 mm.

The measurement by the image analyzer is conducted in the following procedures.

(1) The obtained image is converted into an electronic signal. The converted image date is a monochrome image, and the contrast of the image consists of 256 gradations of 0 (deep-black) to 255 (pure white).

(2) Binarization for defining the borderline of the object (coarse inorganic particle) and the background (polymer) in the image is conducted, and a binarized image in which the particle is white and the background is black (inversely, the particle is black and the background is white) is obtained.

(3) From the number of dots forming the image, the diameter (area circle corresponding diameter) and the number of particles are calculated.

The obtained results are data in which unit area conversion is conducted according to the actual reduced scale of the image, and the number of particles is divided according to the size of the particle diameter.

Measurement is conducted generally in 20 to 40 visual fields, and the measurement results are converted into a value per 1 mm$^2$ of the field area.

In observation and measurement, it is preferred to appropriately adjust the shade and the resolution of the image with a standard sample of which particle diameter and number of particles are known and the threshold to be used in the binarization.

In the copolymerized polyester resin of the present invention, it is necessary that the number of contaminants having a particle diameter of greater than or equal to 5 µm measured by the aforementioned method is less than or equal to 100 per 1 mm$^2$. If the number of contaminants exceeds 100, not only the particles reside on the surface of the film as contaminants to impair the appearance and the quality, but also they further aggregate or accumulate in the melting step at the time of production of a polymer or a film to form coarse contaminants, causing elevation of the back pressure of a filter, occurrence of piercing in the film originating from a coarse contaminant mixed into the film through the filter. This hinders long-term stable production. In particular, in the polyester system in which neopentyl glycol is copolymerized, since the melt viscosity of the resin and the stress against deformation at the time of stretching in the film producing step are small, a relatively small contaminant may lead into a trouble such as piercing or breaking.

For achieving excellent appearance and quality when the copolymerized polyester resin is formed into a film, and satisfying the stable productivity, it is preferred that the number of contaminants in the copolymerized polyester resin of the present invention is less than or equal to 30/mm$^2$.

The contaminants used herein mean insolubilized, aggregated and precipitated inorganic salts or organic salts of the catalyst metal compounds formed in the polymerization system.

In the copolymerized polyester resin of the present invention, it is preferred that a color L value is greater than or equal to 60 for satisfying excellent transparency and color hue when the copolymerized polyester resin is formed into a film. For obtaining excellent heat resistance, it is preferred that a color b value is less than or equal to 6.

(Molding of Copolymerized Polyester Resin)

Next, one example of a method for producing a film using the copolymerized polyester resin of the present invention will be described. The method for producing a polyester film is not limited to the followings. A copolymerized polyester resin polymerized by using the aforementioned specific catalyst is melt-extruded, and molded into a sheet shape on a cooling revolving roller from a T-die to form an unstretched sheet. At this time, by employing the techniques described in Patent Publication No. 6-39521, Patent Publication No. 6-45175, for example, it is possible to achieve high speed film formability. Also various functions may be assigned to a core layer and a skin layer by using a plurality of extruders, and a laminated film may be formed by a co-extrusion method.

An oriented polyester film can be obtained by stretching 1.1 to 6 times in at least one axial direction at a temperature greater than or equal to the glass transition temperature and less than the crystallization temperature of the polyester by using a known method.

For example, in producing a biaxially oriented polyester film, a sequential biaxial stretching method in which monoaxial stretching is conducted in the vertical direction or in the horizontal direction, and then stretching is conducted in the orthogonal direction, a simultaneous biaxial stretching method in which stretching is conducted simultaneously in the vertical direction and in the horizontal direction, a method in which a linear motor is used as a driving method in simultaneous biaxial stretching, and a multi-stage stretching method in which stretching is conducted several times in the same direction, such as a horizontal-vertical-vertical stretching method, a vertical-horizontal-vertical stretching method, or a vertical-vertical-horizontal stretching method can be employed.

Further, after termination of the stretching, it is preferred to conduct a heat fixation treatment for less than or equal to 30 seconds, preferably for less than or equal to 10 seconds at a temperature from (melting point −50° C.) to less than the melting point for 0.5 to 10% vertical relaxing treatment and horizontal relaxing treatment, in order to reduce the heat shrinkage rate of the film.

The thickness of the obtained oriented polyester film is preferably 1 to 1000 μm, more preferably 5 to 500 μm, further preferably 10 to 200 μm. If the thickness is less than 1 μm, the film is a lack of rigidity and difficult to handle. If the thickness is greater than 1000 μm, the film becomes so hard to make handling difficult.

Also, for imparting various functions such as adhesive properties, release properties, antistaticity, infrared absorbency, antibacterial activity, and scratch resistance, the surface of the oriented polyester film may be covered with a polymer resin by a coating method. Also, inorganic and/or organic particles may be contained only in the coating layer, to produce an easily-sliding, highly transparent polyester film. Further, an inorganic vapor deposited layer can be provided to impart various barrier functions against oxygen, water, oligomer and the like, or a conductive layer can be provided by a sputtering method to impart conductivity.

The copolymerized polyester resin of the present invention can be suitably used in a heat-shrinkable film or the like owing to its characteristics. As other use application than films, the copolymerized polyester resin can be suitably used in a transparent molded container, an adhesive binder and the like.

EXAMPLES

Hereinafter, the present invention will be specifically described by way of examples. It is to be noted that the present invention is not limited to these examples.
<Evaluation Method>
(1) Measurement of Carboxylic Acid Group Terminal Concentration (AVo) in Reaction Intermediate Oligomer In 20 mL of chloroform, 0.2 g of an oligomer that was finely weighed was dissolved, and the resulting solution was titrated with a 0.1N—KOH solution in ethanol using phenolphthalein as an indicator, to determine an equivalent (unit; eq/ton) per $10^6$ g of resin.
(2) Measurement of Hydroxyl Group Terminal Concentration (OHVo) in Reaction Intermediate Oligomer To 0.5 g of an oligomer that was finely weighed, 10 mL of an acetylating agent (0.5 mol/L acetic anhydride solution in pyridine) was added, and the resulting solution was dipped in a water bath at greater than or equal to 95° C. for 90 minutes. After removing the solution from the water bath, 10 mL of pure water was added and the solution was allowed to cool to room temperature. Titration with a 0.2N—NaOH—CH$_3$OH solution using phenolphthalein as an indicator was conducted. For a blank not containing a sample, the same operation was conducted. Beforehand, 20 mL of N/10-hydrochloric acid was titrated with a 0.2N—NaOH—CH$_3$OH solution using phenolphthalein as an indicator, and the factor (F) of the solution was determined according to the following formula.

$$F=0.1 \times f \times 20/a$$

(f=N/10-factor of hydrochloric acid, a=titer (mL))
OHVo (eq/ton) was calculated according to the following formula.

$$OHVo=\{(B-A)\times F\times 1000/W\}+AVo$$

(A=titer (mL), B=titer of blank (mL), F=factor of 0.2N—NaOH—CH$_3$OH solution, W=weight of sample (g))
(3) Calculation of OHV % (Percentage of Hydroxyl Terminal Group)

OHV % was calculated according to the following formula from OHVo and AVo determined in the manner as described above, $$OHV\%=\{OHVo/(OHVo+AVo)\}\times 100$$

(4) Reduced viscosity of copolymerized polyester resin (ηsp/C)

In 25 cm$^3$ of a mixed solvent of phenol:tetrachloroethane=60:40 (weight ratio), 0.10 g of a copolymerized polyester resin was dissolved and reduced viscosity was measured at 30° C. with an Ubbelohde viscometer.
(5) Composition of Copolymerized Polyester Resin In chloroform-d solvent, $^1$H-NMR analysis was conducted by using a nuclear magnetic resonance spectrometer (NMR) Gemini-200 available from Varian Inc., and the composition was determined from the integral ratio.
(6) Contents (Remaining Amount) of Various Atoms in Copolymerized Polyester Resin Quantification was conducted in the following manner.
(a) Antimony Atom A sample (1 g) was wet degraded with a mixture of sulfuric acid/hydrogen peroxide solution. Then sodium nitrite was added to render Sb atoms Sb$^{5+}$, and Brilliant Green was added to generate a blue complex with Sb. The complex was extracted with toluene, and absorbance at a wavelength of 625 nm was measured by using an absorptiometer (UV-150-02 available from Shimadzu Corporation), and from the calibration curve prepared in advance, the amount of Sb atoms in the sample was colorimetrically determined.
(b) Phosphorous Atom A sample (1 g) was subjected to a dry ashing degradation in the presence of sodium carbonate or wet degradation in a mixture of sulfuric acid/nitric acid/perchloric acid solution or in a mixture of sulfuric acid/hydrogen peroxide solution to render the phosphorous compound orthophosphoric acid. Subsequently, molybdate was reacted in 1 mol/L of sulfuric acid solution to make phosphomolybdic acid, and the phosphomolybdic acid was reduced with hydrazine sulfate to generate heteropoly blue. Absorbance at a wavelength of 830 nm was measured by using an absorptiometer (UV-150-02 available from Shimadzu Corporation). From the calibration curve prepared in advance, the amount of phosphorous atoms in the sample was determined.
(c) Aluminum Atom A sample (0.1 g) was dissolved in 6 M hydrochloric acid solution, and the resulting solution was left still for one day, and then diluted in pure water to prepare a 1.2 M hydrochloric acid solution for measurement. The prepared solution sample was subjected to radio-frequency plasma emission analysis to quantify aluminum atoms.
(7) Color Measurement of Copolymerized Polyester Resin By using a color-difference meter (ZE-2000 available from NIPPON DENSHOKU INDUSTRIES Co., LTD.), color difference (L, a, b) of a chip of the copolymerized polyester resin was measured.

(8) Evaluation of Contaminants in Copolymerized Polyester Resin

Evaluation of contaminants was conducted according to the aforementioned description (measuring method of number of contaminants). The following is supplementary description.

One chip of a copolymerized polyester resin was sandwiched between two cover glasses (Matsunami Micro Coverglass, 25 mm×25 mm, thickness 0.2 mm), and melted by heating on a hot plate at approximately 300° C., and then pressed into a thickness of 0.8 to 0.9 mm, and then immediately cooled to prepare a sample for observation. The central part along the thickness of the sample was observed by using a phase-contrast optical microscope (available from Nikon Corporation) and an object lens (available from Nikon Corporation, magnification 10 times, aperture 0.5). The image was captured into an image analyzer (Luzex-FS available from Nireco) via a CCD camera, and subjected to image analysis, and the number of particles of greater than or equal to 5 μm was measured. This measurement was conducted 20 times while the visual field was varied, and the total number of particles was determined, and the number of particles of greater than or equal to 5 μm per 1 mm$^2$ of the visual field area was calculated, which was taken as the number of contaminants in the copolymerized polyester resin.

(9) Determination of pressure elevation of filter

A copolymerized polyester resin was extruded by using a monoaxial extrusion spinning machine having 20 mmφ equipped with a gear pump and a filter, and elevation in pressure exerted on the filter was measured. The filter was a metal nonwoven type 20 μm (NASLON NF-08), filter diameter was 16 mm (filtration area 2.01 cm$^2$), and discharge was 5 g/minute. The extrusion was conducted at a temperature of 285° C. The pressure elevation coefficient k per unit time was determined according to the following formula, and it was determined as being practically unproblematic when k≤5.

$$k=\Delta P(\text{MPa/h})/(Q(\text{kg/h})/S(\text{cm}^2))$$

(ΔP represents pressure elevation per one hour (MPa/h), Q represents discharge per one hour (kg/h), and S represents area of filter (cm$^2$))

○: k≤5
Δ: 5<k≤10
x: k>10

(10) Determination of Contaminants in Film

From the opposite direction of a film cut into 200 mm×300 mm, light of a fluorescent lamp was applied, and the bright spots observed visually were counted as contaminants. The total number of contaminants was calculated for ten films, and determination was made according to the following criteria.

○: the number of contaminants was less than or equal to 100
Δ: the number of contaminants was 101 to 500
x: the number of contaminants was greater than or equal to 501

<Preparation of Polymerization Catalyst Solution>
(Solution of Phosphorous Compound in Ethylene Glycol)

After adding 2.0 litters of ethylene glycol to a flask equipped with a nitrogen introducing tube and a condenser at normal temperature and normal pressure, 200 g of Irganox1222 (available from BASF) represented by chemical formula (4) was added as a phosphorous compound under stirring at 200 rpm in a nitrogen atmosphere. Further, 2.0 litters of ethylene glycol was added, and the setting temperature of the jacket was changed to 196° C. and the temperature was elevated, and from the point of time when the inner temperature reached greater than or equal to 185° C., stirring was conducted for 60 minutes under a reflux. Then the heating was stopped, and the solution was immediately removed from the heat source, and cooled to less than or equal to 120° C. in 30 minutes while it was kept in the nitrogen atmosphere.

(Solution of Aluminum Compound in Ethylene Glycol)

After adding 5.0 litters of pure water to a flask equipped with a condenser at normal temperature and normal pressure, 200 g of basic aluminum acetate (hydroxyaluminum diacetate) was added as a slurry with pure water under stirring at 200 rpm. Further, pure water was added so that the total volume was 10.0 litters, and the resulting solution was stirred for 12 hours at normal temperature and normal pressure. Then, the setting temperature of the jacket was changed to 100.5° C. and the temperature was elevated, and from the point of time when the inner temperature reached greater than or equal to 95° C., stirring was conducted for 3 hours under a reflux. The stirring was stopped, and the solution was allowed to cool to room temperature. At this time, when undissolved particles were observed, the solution was filtered through a glass filter (3G) to obtain an aqueous solution of the aluminum compound.

Subsequently, in a flask equipped with a distilling apparatus, 2.0 litters of the aqueous solution of the aluminum compound and 2.0 litters of ethylene glycol were charged at normal temperature and normal pressure, and stirred for 30 minutes at 200 rpm, and then a uniform water/ethylene glycol mixed solution was obtained. Then the setting temperature of the jacket was changed to 110° C. and the temperature was elevated, and water was distilled off from the solution. At the point of time when the amount of the distilled-off water reached 2.0 litters, the heating was stopped, and the solution was allowed to cool to room temperature, and thus a solution of the aluminum compound in ethylene glycol was obtained.

In the following description, "part(s)" represents "part(s) by mass".

Example 1

In a reaction can equipped with a stirrer, a thermometer and a condenser for distillation, 2130 parts of terephthalic acid, 1140 parts of ethylene glycol, and 815 parts of neopentyl glycol were charged, and 0.7 parts of triethylamine was added, and the temperature was gradually elevated from 220° C. to 250° C. under pressurization at 0.35 MPa, and esterification was conducted while the distilled water was removed outside the system. The oligomer obtained by esterification was sampled, and AVo and OHVo of the oligomer were measured, and OHV % (percentage of hydroxyl terminal group) was calculated. Subsequently, as the polymerization catalyst solution, a mixed solution of the solution of a phosphorous compound in ethylene glycol and the solution of an aluminum compound in ethylene glycol was added so that phosphorous atoms were 0.047 mol % and aluminum atoms were 0.021 mol % with respect to the dicarboxylic acid component in the copolymerized polyester resin, and initial polymerization under reduced pressure up to 1.3 kPa was conducted over one hour, and the temperature was elevated to 270° C., and latter polymerization was conducted at less than or equal to 0.13 kPa, to obtain a copolymerized polyester resin. The resin was taken out in the form of a strand from the reaction can, and solidified by cooing, and then cut into a chip shape. Characteristics of the obtained copolymerized polyester resin are shown in Table 1.

For the obtained copolymerized polyester resin, elevation of the pressure applied on the filter was evaluated by using a monoaxial extrusion spinning machine. Also, a sheet of 200 μm thick was produced by using a small extruder, and the sheet was stretched 3.2 times in the vertical direction and 3.8 times in the horizontal direction by using a biaxial stretching film forming machine, to obtain a biaxially-stretched film. Contaminants in the obtained film were evaluated. The evaluation results are shown in Table 1.

Example 2

In a reaction can equipped with a stirrer, a thermometer and a condenser for distillation, 2130 parts of terephthalic acid, 850 parts of ethylene glycol, and 1350 parts of neopentyl glycol were charged, and 0.7 parts of triethylamine was added, and the temperature was gradually elevated from 220° C. to 250° C. under pressurization at 0.35 MPa, and esterification was conducted while the distilled water was removed outside the system. The oligomer obtained by esterification was sampled, and AVo and OHVo of the oligomer were measured, and OHV % (percentage of hydroxyl terminal group) was calculated. Subsequently, as the polymerization catalyst solution, a mixed solution of the solution of a phosphorous compound in ethylene glycol and the solution of an aluminum compound in ethylene glycol was added so that phosphorous atoms were 0.047 mol % and aluminum atoms were 0.021 mol % with respect to the dicarboxylic acid component in the copolymerized polyester resin, and initial polymerization under reduced pressure up to 1.3 kPa was conducted over one hour, and the temperature was elevated to 270° C., and latter polymerization was conducted at less than or equal to 0.13 kPa, to obtain a copolymerized polyester resin. The obtained copolymerized polyester resin was evaluated in the same manner as in Example 1. The evaluation results are shown in Table 1.

Example 3

In a reaction can equipped with a stirrer, a thermometer and a condenser for distillation, 2130 parts of terephthalic acid, 1310 parts of ethylene glycol, and 690 parts of neopentyl glycol were charged, and 0.7 parts of triethylamine was added, and the temperature was gradually elevated from 220° C. to 250° C. under pressurization at 0.35 MPa, and esterification was conducted while the distilled water was removed outside the system. The oligomer obtained by esterification was sampled, and AVo and OHVo of the oligomer were measured, and OHV % (percentage of hydroxyl terminal group) was calculated. Subsequently, as the polymerization catalyst solution, a mixed solution of the solution of a phosphorous compound in ethylene glycol and the solution of an aluminum compound in ethylene glycol was added so that phosphorous atoms were 0.047 mol % and aluminum atoms were 0.021 mol % with respect to the dicarboxylic acid component in the copolymerized polyester resin, and initial polymerization under reduced pressure up to 1.3 kPa was conducted over one hour, and the temperature was elevated to 270° C., and latter polymerization was conducted at less than or equal to 0.13 kPa, to obtain a copolymerized polyester resin. The obtained copolymerized polyester resin was evaluated in the same manner as in Example 1. The evaluation results are shown in Table 1.

Example 4

Esterification and polycondensation were conducted in the same manner as in Example 1 except that the charged ethylene glycol was changed to ethylene glycol derived from biomass resources (available from India Glycols) in Example 1, to obtain a copolymerized polyester resin. The obtained copolymerized polyester resin was evaluated in the same manner as in Example 1. The evaluation results are shown in Table 1.

Example 5

In a reaction can equipped with a stirrer, a thermometer and a condenser for distillation, 2130 parts of terephthalic acid, 1085 parts of ethylene glycol, and 775 parts of neopentyl glycol were charged, and 0.7 parts of triethylamine was added, and the temperature was gradually elevated from 220° C. to 250° C. under pressurization at 0.35 MPa, and esterification was conducted while the distilled water was removed outside the system. The oligomer obtained by esterification was sampled, and AVo and OHVo of the oligomer were measured, and OHV % (percentage of hydroxyl terminal group) was calculated. Subsequently, as the polymerization catalyst solution, a mixed solution of the solution of a phosphorous compound in ethylene glycol and the solution of an aluminum compound in ethylene glycol was added so that phosphorous atoms were 0.047 mol % and aluminum atoms were 0.021 mol % with respect to the dicarboxylic acid component in the copolymerized polyester resin, and initial polymerization under reduced pressure up to 1.3 kPa was conducted over one hour, and the temperature was elevated to 270° C., and latter polymerization was conducted at less than or equal to 0.13 kPa, to obtain a copolymerized polyester resin. The obtained copolymerized polyester resin was evaluated in the same manner as in Example 1. The evaluation results are shown in Table 1.

Example 6

In a reaction can equipped with a stirrer, a thermometer and a condenser for distillation, 2130 parts of terephthalic acid, 1025 parts of ethylene glycol, and 730 parts of neopentyl glycol were charged, and 0.7 parts of triethylamine was added, and the temperature was gradually elevated from 220° C. to 250° C. under pressurization at 0.35 MPa, and esterification was conducted while the distilled water was removed outside the system. The oligomer obtained by esterification was sampled, and AVo and OHVo of the oligomer were measured, and OHV % (percentage of hydroxyl terminal group) was calculated. Subsequently, as the polymerization catalyst solution, a mixed solution of the solution of a phosphorous compound in ethylene glycol and the solution of an aluminum compound in ethylene glycol was added so that phosphorous atoms were 0.047 mol % and aluminum atoms were 0.021 mol % with respect to the dicarboxylic acid component in the copolymerized polyester resin, and initial polymerization under reduced pressure up to 1.3 kPa was conducted over one hour, and the temperature was elevated to 270° C., and latter polymerization was conducted at less than or equal to 0.13 kPa, to obtain a copolymerized polyester resin. The obtained copolymerized polyester resin was evaluated in the same manner as in Example 1. The evaluation results are shown in Table 1.

Comparative Example 1

In a reaction can equipped with a stirrer, a thermometer and a condenser for distillation, 2130 parts of terephthalic acid, 1100 parts of ethylene glycol, and 620 parts of neopentyl glycol were charged, and 0.7 parts of triethylamine was added, and the temperature was gradually elevated from 220° C. to 250° C. under pressurization at 0.35 MPa, and esterification was conducted while the distilled water was removed outside the system. The oligomer obtained by esterification was sampled, and AVo and OHVo of the oligomer were measured, and OHV % (percentage of hydroxyl terminal group) was calculated. Subsequently, an antimony trioxide solution was added so that antimony atoms were 0.045 mol % with respect to the dicarboxylic acid component in the copolymerized polyester resin, and initial polymerization under reduced pressure up to 1.3 kPa was conducted over one hour, and the temperature was elevated to 270° C., and latter polymerization was conducted at less than or equal to 0.13 kPa, to obtain a copolymerized polyester resin. The obtained copolymerized polyester resin was evaluated in the same manner as in Example 1. The evaluation results are shown in Table 2.

Comparative Example 2

Esterification and polycondensation were conducted in the same manner as in Example 1 except that the termination time of esterification under pressurization was shortened in Example 1, to obtain a copolymerized polyester resin. The obtained copolymerized polyester resin was evaluated in the same manner as in Example 1. The evaluation results are shown in Table 2.

Comparative Example 3

Esterification and polycondensation were conducted in the same manner as in Example 1 except that the termination time of esterification under pressurization was prolonged in Example 1, to obtain a copolymerized polyester resin. In the method of this comparative example, since the speed of polyester polycondensation was low and the melt viscosity of the obtained resin was low, the subsequent evaluation was not conducted.

Comparative Example 4

Esterification and polycondensation were conducted in the same manner as in Example 1 except that the charged amounts of the raw materials were 2130 parts of terephthalic acid, 1360 parts of ethylene glycol, and 980 parts of neopentyl glycol in Example 1, to obtain a copolymerized polyester resin. In the method of this comparative example, since the speed of polyester polycondensation was low and the melt viscosity of the obtained resin was low, the subsequent evaluation was not conducted.

Comparative Example 5

Esterification and polycondensation were conducted in the same manner as in Example 1 except that the introduced amounts of the raw materials were 2130 parts of terephthalic acid, 910 parts of ethylene glycol, and 650 parts of neopentyl glycol in Example 1, to obtain a copolymerized polyester resin. The obtained copolymerized polyester resin was evaluated in the same manner as in Example 1. The evaluation results are shown in Table 2.

TABLE 1

| | | | Example 1 | Example 2 | Example 3 | Example 4 | Example 5 | Example 6 |
|---|---|---|---|---|---|---|---|---|
| Copolymerized polyester resin (composition) | Terephthalic acid | mol % | 100 | 100 | 100 | 100 | 100 | 100 |
| | Ethylene glycol | mol % | 68 | 43 | 73 | 68 | 68 | 68 |
| | Neopentyl glycol | mol % | 30 | 55 | 25 | 30 | 30 | 30 |
| | Diethylene glycol | mol % | 2 | 2 | 2 | 2 | 2 | 2 |
| | Catalyst type | — | Al/P | Al/P | Al/P | Al/P | Al/P | Al/P |
| | Catalyst atom remaining amount | ppm | 30/60 | 30/58 | 30/65 | 30/62 | 30/60 | 30/60 |
| Physical properties of oligomer | AVo | eq/ton | 740 | 730 | 600 | 750 | 790 | 850 |
| | OHVo | eq/ton | 1200 | 1160 | 1100 | 1210 | 1050 | 970 |
| | OHV % | % | 62 | 61 | 65 | 62 | 57 | 53 |
| Resin color | L | — | 65 | 63 | 66 | 65 | 65 | 64 |
| | b | — | 5 | 6 | 4 | 5 | 5 | 5 |
| Resin contaminants | Number | Number/mm$^2$ | 8 | 10 | 5 | 8 | 28 | 72 |
| Resin viscosity | Reduced viscosity | dl/g | 0.73 | 0.73 | 0.73 | 0.73 | 0.73 | 0.73 |
| Evaluation | Filter pressure elevation | — | ○ | ○ | ○ | ○ | ○ | ○ |
| | Number of contaminants in film | — | ○ | ○ | ○ | ○ | ○ | Δ |

TABLE 2

| | | | Comparative Example 1 | Comparative Example 2 | Comparative Example 3 | Comparative Example 4 | Comparative Example 5 |
|---|---|---|---|---|---|---|---|
| Copolymerized polyester resin (composition) | Terephthalic acid | mol % | 100 | 100 | 100 | 100 | 100 |
| | Ethylene glycol | mol % | 68 | 68 | 68 | 68 | 68 |
| | Neopentyl glycol | mol % | 30 | 30 | 30 | 30 | 30 |
| | Diethylene glycol | mol % | 2 | 2 | 2 | 2 | 2 |
| | Catalyst type | — | Sb | Al/P | Al/P | Al/P | Al/P |
| | Catalyst atom remaining amount | ppm | 280 | 30/65 | 30/57 | 30/60 | 30/60 |
| Physical properties of oligomer | AVo | eq/ton | 350 | 1020 | 310 | 800 | 550 |
| | OHVo | eq/ton | 1100 | 1280 | 1090 | 1470 | 660 |
| | OHV % | % | 76 | 56 | 78 | 65 | 55 |

TABLE 2-continued

|  |  |  | Comparative Example 1 | Comparative Example 2 | Comparative Example 3 | Comparative Example 4 | Comparative Example 5 |
|---|---|---|---|---|---|---|---|
| Resin color | L | — | 49 | 58 | 61 | 63 | 64 |
|  | b | — | 8 | 5 | 8 | 8 | 5 |
| Resin contaminants | Number | Number/mm$^2$ | 210 | 115 | 10 | 25 | 130 |
| Resin viscosity | Reduced viscosity | dl/g | 0.73 | 0.73 | 0.49 | 0.49 | 0.73 |
| Evaluation | Filter pressure elevation | — | X | X | — | — | X |
|  | Number of contaminants in film | — | X | X | — | — | X |

INDUSTRIAL APPLICABILITY

The copolymerized polyester resin according to the present invention can be widely used as a material for various molded articles such as films, sheets, blow molded bottles, and engineering plastics because entry of contaminants is suppressed and high degree of clarification is realized. In particular, the copolymerized polyester resin is suited as a material for films, or molded articles in which the degree of clarification is highly required. Therefore, the copolymerized polyester resin is industrially very useful.

The invention claimed is:

1. A copolymerized polyester resin comprising a dicarboxylic acid component and diol components as constituting components, wherein as the dicarboxylic acid component, greater than or equal to 90 mol % of terephthalic acid is contained, and as the diol components, 39 to 79 mol % of ethylene glycol, 20 to 60 mol % of neopentyl glycol, and 1 to 5 mol % of diethylene glycol are contained, and a reduced viscosity is greater than or equal to 0.50 dl/g, and the number of contaminants per 1 mm$^2$ observed by using a phase-contrast optical microscope in a sample of the copolymerized polyester resin having a thickness of 0.8 to 0.9 mm is less than or equal to 100, the contaminants having a particle diameter of greater than or equal to 5 µm.

2. The copolymerized polyester resin according to claim 1, wherein a color L value is greater than or equal to 60, and a color b value is less than or equal to 6.

3. The copolymerized polyester resin according to claim 1, wherein as a polymerization catalyst, at least one selected from aluminum compounds and at least one selected from phosphorous compounds are contained in the copolymerized polyester resin.

4. The copolymerized polyester resin according to claim 3, which is obtained by esterifying the dicarboxylic acid component and the diol components so that a carboxylic acid group terminal concentration and a hydroxyl group terminal concentration of a reaction intermediate oligomer after termination of the esterification are 400 to 900 eq/ton, and 700 to 1400 eq/ton, respectively, and conducting polycondensation.

5. The copolymerized polyester resin according to claim 3, wherein as the diol components, a diol component containing ethylene glycol derived from biomass resources is used.

6. The copolymerized polyester resin according to claim 1, which is obtained by esterifying the dicarboxylic acid component and the diol components so that a carboxylic acid group terminal concentration and a hydroxyl group terminal concentration of a reaction intermediate oligomer after termination of the esterification are 400 to 900 eq/ton, and 700 to 1400 eq/ton, respectively, and conducting polycondensation.

7. The copolymerized polyester resin according to claim 1, wherein as the diol components, a diol component containing ethylene glycol derived from biomass resources is used.

8. A heat-shrinkable film comprising the copolymerized polyester resin according to claim 1.

9. A heat-shrinkable film comprising the copolymerized polyester resin according to claim 3.

10. A molded article comprising the copolymerized polyester resin according to claim 1.

11. A molded article comprising the copolymerized polyester resin according to claim 3.

12. A sheet comprising the copolymerized polyester resin according claim 1.

13. A sheet comprising the copolymerized polyester resin according claim 3.

14. An adhesive comprising the copolymerized polyester resin according claim 1.

15. An adhesive comprising the copolymerized polyester resin according claim 3.

* * * * *